United States Patent [19]

Egerton et al.

[11] Patent Number: 4,806,333
[45] Date of Patent: Feb. 21, 1989

[54] FINELY DIVIDED OXIDE AND ITS MANUFACTURE

[75] Inventors: Terence A. Egerton, Stockton on Tees; Kevin A. Fothergill, Darlington, both of England

[73] Assignee: Tioxide Group PLC, London, England

[21] Appl. No.: 922,480

[22] Filed: Oct. 22, 1986

[30] Foreign Application Priority Data

Nov. 9, 1985 [GB] United Kingdom ............... 8527716

[51] Int. Cl.[4] ............................................. C01F 7/02
[52] U.S. Cl. ............................... 423/625; 423/111; 423/133; 423/628; 501/153
[58] Field of Search ............... 423/625, 628, 133, 111; 501/153

[56] References Cited

U.S. PATENT DOCUMENTS

| Re. 25,864 | 9/1965 | Hughes et al. | 423/625 |
|---|---|---|---|
| 3,130,008 | 4/1964 | Stokes et al. | 423/625 |
| 3,449,072 | 6/1969 | Freeman | 423/625 |
| 3,486,913 | 12/1969 | Zirngibl et al. | 423/625 |
| 4,241,042 | 12/1980 | Matijevic et al. | 423/610 |
| 4,532,224 | 7/1985 | Hori | 501/153 |
| 4,574,078 | 3/1986 | Cortesi et al. | 423/625 |

FOREIGN PATENT DOCUMENTS

| 0103448 | 3/1984 | European Pat. Off. | 423/610 |
|---|---|---|---|
| 0117755 | 9/1984 | European Pat. Off. | 423/610 |
| 0151490 | 8/1985 | European Pat. Off. | 423/610 |
| 919019 | 2/1963 | United Kingdom | 423/610 |
| 1040657 | 9/1966 | United Kingdom | 423/625 |
| 1145287 | 3/1969 | United Kingdom | 423/610 |
| 1181479 | 2/1970 | United Kingdom | 423/610 |
| 1279208 | 6/1972 | United Kingdom | 423/610 |

OTHER PUBLICATIONS

Journal of Paint Technology, vol. 47, No. 604, May 1975, "Review of Common Methods of Particle Size Measurement", pp. 35-56.
J. Australian Ceramic Soc., "Submicron AlO-TiO Powders Condensed from a Plasma", by M. S. J. Gani and R. McPherson, Nov. 1972, pp. 65-69.
Bulletin of the Chemical Society of Japan, "Reaction between Aluminium Trichloride and Oxygen in the Vapor Phase and Properties of the Aluminium Oxide Formed", by Y. Shoji, K. Tatsumi, R. Matsuzaki and Y. Saeki, vol. 53, pp. 269-270, 1980.

Primary Examiner—Robert L. Stoll
Assistant Examiner—Paige C. Harvey
Attorney, Agent, or Firm—Banner, Birch, McKie and Beckett

[57] ABSTRACT

A product suitable as a ceramic comprises substantially nonaggregated alumina particles with 95% by number having an aspect ratio (i.e., the ratio of the longest dimension to the shortest dimension for any single particle) not greater than 1.1 and more than 80% having an aspect ratio not greater than 1.05 and having a geometric mean size of from 0.02 to 0.5 microns. Usually the product contains no more than 3% by weight as aggregates and preferably the product is as small as can conveniently be manufactured.

11 Claims, 1 Drawing Sheet

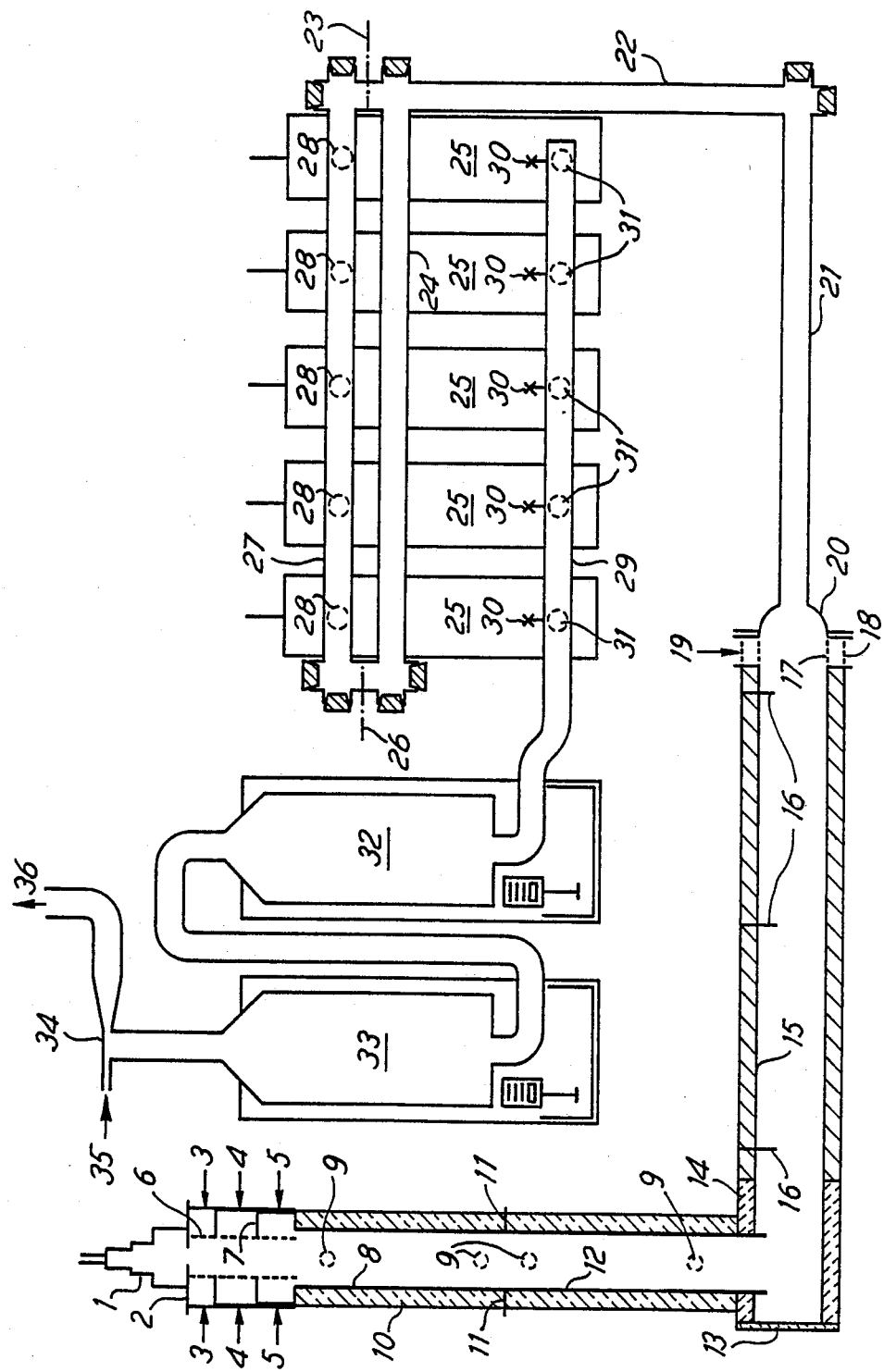

FINELY DIVIDED OXIDE AND ITS MANUFACTURE

This invention relates to a finely divided oxide and particularly to a finely divided aluminium oxide suitable for use as a ceramic material.

According to the present invention a product suitable for use as a ceramic material comprises alumina in the form of substantially non aggregated particles which are substantially spherical in shape with greater than 95% by number of the said particles having an aspect ratio not greater than 1.1 and greater than 80% by number having an aspect ratio not greater than 1.05 and each particle formed substantially of alumina and the geometric weight mean size of the product being between 0.02 and 0.5 microns.

By the term "aspect ratio" as used in this specification there is meant the ratio of the longest dimension to the shortest dimension for any single particle.

As will be seen the product in accordance with the invention is a finely divided alumina in wich the particles are substantially spherical in shape and non aggregated The product of the invention comprises the particles of alumina, i.e. aluminium oxide, which is substantially free of sodium. Preferably the maximum amount of sodium compounds which can be present is 300 ppm by weight as Na and most preferably less than 100 ppm as Na.

If desired the product as described hereinbefore may comprise delta alumina with substantially no alpha alumina being present.

As stated the product of the invention comprises substantially spherical particles of alumina having an aspect ratio not greater than 1.1. It will be understood that the particulate product should contain greater than 95% by weight of the particles having this maximum aspect ratio and greater than 80% by number of the particles should have an aspect ratio of not greater than 1.05.

The product of the invention is substantially non aggregated, i.e. the product consists of individual spherical particles, and naturally it is desirable that few if any aggregates are present although practically it is impossible to produce a product which does not contain some small aggregates. Consequently the product preferably contains no more than 3% by weight in an aggregated form.

The product in accordance with the invention has a geometric weight means of between 0.02 and 0.5 microns and this mean size is determined by counting and sizing the individual particles shown in suitable electron micrographs. It has been observed that the size distributions for various samples of the product are a good fit to a log normal distribution with a standard deviation typically being 1.4 to 1.5. Preferably the geometric weight mean size of the product is from 0.04 to 0.3 microns and most preferably the product is as small as can conveniently be manufactured and has a geometric weight mean size of from 0.05 to 0.2 microns.

Investigation of the product in accordance with the invention to determine the nitrogen adsorbtion and employing the application of BET theory produced results which correspond quite closely with particle sizes determined from electron micrographs. The implication of this finding is that the product in accordance with the invention is not appreciably porous. The size of the crystallites which form the alumina particles may be inferred from the broadening of X ray diffraction lines. The amount of broadening implies that the spheres seen individually on the electron micrographs are not "blackberry-type" agglomerates. Such blackberry type agglomerates of ultra fine particles are often found in products of finely divided silica.

The novel product of the present invention is manufactured by the vapor phase oxidation of a vaporisable aluminium compound typically an aluminium halide such as aluminium chloride. The oxidation of the product is carried out under such conditions that the vaporisable halide reacts with oxygen at a very high temperature to produce the individually non aggregated particles of spherical alumina. It has been shown that the vapor phase oxidation process should be carried out under such conditions that the temperature attained is above the melting point of alumina and consequently exceeds approximately 2050° C. Preferably the temperature is at least 2300° C. The oxidation can be carried out at or about atmospheric pressure or at superatmospheric pressure, if desired.

The attainment of such high temperatures for ensuring the appropriate oxidation is essential in producing the required product of the correct particle size and shape. It is believed that at such high oxidation temperatures chlorine which is produced as a by-product from the oxidation reaction tends to dissociate but it is believed that operation under superatmospheric pressure diminishes this dissociation.

It has also been discovered that the particle size of the product can be varied by changing the rate of feed of aluminium halide to the reactor as well as varying the other conditions as described.

The attainment of the high oxidation temperature is most easily achieved through the use of an electrical plasma heating system in which an inert gas or the oxygen are heated by passing through an electric arc between electrodes, a socalled plasma gun, which is supplied with electrical energy at such a level of power to impart the necessary heating to the reagents prior to feeding into the reaction chamber itself and subsequently cooling, collection and separation apparatus.

Naturally the amount of electrical power fed into the reactants depends on the actual temperature rise required and also on the other conditions associated with rates of flow and actual initial reaction temperature levels. It would be expected that a commercial operating manufacturing plant manufacturing a substantial quantity of the product would require the input of a far greater electrical energy than a laboratory or pilot plant set up.

The requirement that the product shall be relatively pure and free from particular metal impurities means that this form of heating employing electrical power is to be most preferred because it avoids heating by burning fuel which can introduce objectionable impurities into sensitive reaction systems.

The product in accordance with the invention is particularly useful for the manufacture of ceramic bodies in which the material may be subjected to grinding if desired and mixing with any particular chosen binding agent and formed into a ceramic green body such as by moulding or any other suitable technique. The green body is then fired at an elevated temperature to produce the chosen ceramic material. The product of the invention has been found to sinter more easily than known products, for example, the product sinters at a lower temperature, say 1250° C., compared with 1600° C. for the prior products.

BRIEF DESCRIPTION OF DRAWING

One form of apparatus which may be used in the laboratory at about atmospheric pressure to manufacture the spherical alumina in accordance with the invention is shown in diagrammatic form in the attached drawing.

This drawing shows an electric arc plasma gun 1 mounted on a reactor head 2 formed of nickel with a barrel formed of aluminium metal. Below the reactor head 2 there is located a gas inlet 3 above a second gas inlet 4 which is itself mounted above a third gas inlet 5 each feeding a desired combination of gases to sets of burner rings 6 located radially inwardly of each of said inlets 3, 4 and 5. Depending on the particular conditions to be used the burner rings 6 can be formed of a suitable metal such as nickel or a ceramic material.

The various gas inlets 3, 4 and 5 are separated by nickel or ceramic plates 7 whereby gas flow through the various inlets 3, 4 and 5 are directed radially inwardly into the innermost part of a reactor column 8 formed of silica on which the gas inlet assemblies are mounted.

The reactor column 8 is provided with a number of ports or apertures 9 through which a thermocouple may be introduced into the reactor column 8 and surrounding the reactor column 8 is thermal insulating material 10. At the bottom of the reactor column 8 there is located an annular connecting plate 11 formed of nickel which effectively connects the reactor column 8 with a similar but lower reactor column 12 formed of silica which forms the bottom section of the overall reactor. The lower reactor column 12 terminates in a discharge assembly which is provided with a removable refractory plate 13 carried on the refractory base section 14 which connects with ducting 15 formed of silica. The silica ducting 15 is equipped with a number of thermocouples 16 and has at its other end opposite the refractory plate 13 a perforated annular quench ring 17 formed of aluminium metal forming part of and carried by a housing 18 which is provided with a gas inlet 19.

The ducting is secured through a suitable adaptor 20 to a reduced diameter ducting formed of heat resistant glassware 21 and 22 which is connected to a sliding valve assembly 23. This assembly 23 is shown in its closed position acros the ducting 22. Ducting 22 is joined to a further ducting 24 mounted at right angles to the ducting 22 immediately prior to the position of the sliding valve assembly 23. The ducting 24 is connected to five separated filters 25 consisting of polypropylene pots containing woven filter socks formed from polytetrafluoroethylene. Positioned at the end of ducting 24 is a further sliding valve assembly 26 leading to an inlet manifold 27 formed of polypropylene which is connected to the filter pots via inlet apertures 28.

At the other end of the filter pots 25 there is an outlet manifold 29 formed of polypropylene which is connectable via valves 30 to the outlet pipes 31 of each filter pot 25. The outlet manifold 29 is connected at its other end to a scrubbing unit 32, containing caustic soda solution or water as is appropriate, and this unit 32 is then connected to a second gas scrubbing unit 33 containing caustic soda solution. The outlet from the second gas scrubbing unit 33 is fed to a venturi type gas injector 34 which is fed by an injector gas through an inlet 35 to a stack connected to an outlet 36 so that the gas pressure in the assembly is maintained through the flow through the venturi injector 34 at less than ambient atmospheric pressure.

EXAMPLE 1

Argon gas flowing at a rate of from 2 to 4 gram moles per minute was passed through the plasma gun assembly 1 of the apparatus shown in the attached drawing which was supplied with electrical energy at a voltage of 29 volts and at 550 amps to raise the temperature of the reactor and subsequently parts of the apparatus to that desired. Compressed air was fed through gas inlet 35 at a rate sufficient to reduce the pressure in the apparatus to a value of from 5 to 7.5 cms water gauge below atmospheric pressure. The actual amount of power supplied to the argon gas flowing through the plasma assembly was 120 kilocals per minute.

Oxygen gas preheated to 620K was introduced through gas inlet 3 at a rate of 1.25 moles per minute. Argon gas at a rate of 1.44 moles per minute was introduced through gas inlet 4 and the gas had been preheated to a temperature of 590K.

Preheating of the gases was achieved by passing the unheated gas over silica chips contained in a silica tube maintained at a temperature of 870K by means of electrical resistance elements.

A fluidised bed vaporizer was connected to gas inlet 5 and the fluidised bed contained sand particles which were fluidised by the passage of 0.44 mole per minute of argon gas. The bed was heated to a temperature of about 900K and the argon was introduced through gas inlet 5 into the reactor at a temperature of about 670K.

When the thermocouples in the reactor columns 8 and 12 and those in the duct 15 were steady in showing no further temperature rise it was considered that the apparatus had reached a steady state in so far as temperature was concerned and solid aluminim chloride was fed to the fluidised bed vaporizer. A mixture of aluminium chloride and argon in the vapor form was produced in the fluidised bed vaporizer and fed to the gas inlet 5 at a rate of 26.7 grams per minute (aluminim chloride) at a temperature of 670K.

The supply of aluminium chloride was continued for 105 minutes. The feed was then stopped and after 10 minutes all electrical power to the plasma gun assembly 1 was switched off. Alumina was produced through the oxidation of the aluminium chloride and collected in the filters 25. The equilibrium temperature of reaction was calculated to be 2750K. A total of 394 grams $Al_2O_3$ was removed from the filters 25 and 406 grams of $Al_2O_3$ from the associated reactor pipework. The product was a white powder and was found by transmission electron microscopy to consist of discrete spherical crystals of the size range 0.1086 microns geometric weight mean diameter. The standard deviation was 1.50. The product consisted of delta alumina and was free of alpha alumina.

EXAMPLE 2

This example describes the oxidation of $AlCl_3$ at a pressure of 3.5 atmospheres using an apparatus derived from that described in Example 1.

Oxygen gas flowing at a rate of 1.5 to 2 moles per minute was passed through the plasma gun assembly 1, which was supplied with electrical energy at 115 volts and 200 amps. The actual amount of power supplied to the oxygen gas was 17.4 kilowatts. The reactor columns 8 and 12 and the reactor ducting 15 were modified to enable them to withstand an internal pressure of 5 atmospheres above ambient pressure and an additional quench ring was placed at 11. A pressure of 3.5 atospheres was produced in the reactor by placing an annular orifice, of 0.48 cm in diameter, after the quench ring 17. Sufficient compressed air was fed through gas inlet 35 to reduce the pressure in the filters to a value of 5 to 7.5 cms water gauge below atmospheric pressure.

1.25 moles per minute of oxygen gas was preheated to 620K and introduced to the reactor through gas inlet 3. Argon gas, preheated to 590K was introduced through gas inlet 4.

When the thermocouples 9 and 16 were steady in showing no further temperature rise, solid aluminium chloride was fed to the vaporizer at a rate of 82.7 grams per minute. This was fed through gas inlet 5 with 0.44 moles per minute of fluidising argon at 670K. The equilibrium temperature of reaction was calculated to be 2970K. The supply of aluminium chloride was stopped after 33 minutes. A total of 594 grams of $Al_2O_3$ was recovered from the filters. The product was found by electron microscopy to consist of discrete spherical crystals of 0.20 microns geometric weight mean diameter. The standard deviation was 1.47. The product consisted of delta alumina and was free of alpha alumina.

We claim:

1. In a ceramic material comprising a plurality of substantially non-aggregated spherical alumina particles having a geometric weight mean size between 0.02 and 0.5 microns, the improvement comprising:
   each of the particles consisting essentially of crystalline delta alumina; and
   each of the particles having a highly spherical shape wherein greater than 95% of said particles have an aspect ratio of less than or equal to 1.1 and greater than 80% of said particles have an aspect ratio of less than or equal to 1.05.

2. A product according to claim 1 in which the particles contain no more than 300 ppm of a sodium compound expressed as Na.

3. A product according to claim 2 in which the amount of sodium compound is less than 100 ppm as Na.

4. A product according to claim 1 in which no more than 3% by weight of said particles are present in an aggregated form.

5. A product according to claim 1 in which the geometric weight mean size of the product is from 0.04 to 0.3 microns.

6. A product according to claim 5 in which the geometric weight mean size is from 0.05 to 0.2 microns.

7. A process for the manufacture of the crystalline delta alumina particles of claim 1, comprising oxidizing a gas consisting essentially of aluminum halide in an oxidation reactor at a temperature in a range of about 2050° C. to 2700° C.; and
   feeding the aluminum halide gas into the oxidation reactor to form said crystalline delta alumina particles having a geometric weight mean particle size in the range of 0.02 to 0.5 microns.

8. A process according to claim 7 in which the temperature attained is at least 2300° C.

9. A process according to claims 7 or 8 in which the oxidation is carried out at or about atmospheric pressure.

10. A process according to claims 7 or 8 in which the oxidation is carried out under superatmospheric pressure.

11. A process according to claim 7 in which an inert gas or oxygen is heated by an electrical plasma prior to mixing with said aluminium halide.

* * * * *